US010634050B2

(12) United States Patent
Beutin et al.

(10) Patent No.: US 10,634,050 B2
(45) Date of Patent: Apr. 28, 2020

(54) AIR CIRCULATION DEVICE FOR A TURBOMACHINE COMPRISING A HOT AIR BYPASS SYSTEM TO A HEAT EXCHANGER

(71) Applicant: SAFRAN AIRCRAFT ENGINES, Paris (FR)

(72) Inventors: Bruno Albert Beutin, Evry (FR); Nuria Llamas Castro, Tournefeuille (FR); Maria Natal, Paris (FR); Bruna Manuela Ramos, Seine Port (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 460 days.

(21) Appl. No.: 15/498,970

(22) Filed: Apr. 27, 2017

(65) Prior Publication Data

US 2017/0314465 A1    Nov. 2, 2017

(30) Foreign Application Priority Data

Apr. 28, 2016    (FR) ...................................... 16 53817

(51) Int. Cl.
*F01D 5/08*    (2006.01)
*F02C 6/08*    (2006.01)
(Continued)

(52) U.S. Cl.
CPC ................ *F02C 6/08* (2013.01); *F02C 7/047* (2013.01); *F02C 7/14* (2013.01); *F02C 7/18* (2013.01);
(Continued)

(58) Field of Classification Search
CPC .. F02K 3/025; F02C 7/047; F02C 9/18; F05D 2220/32; F05D 2260/213
USPC .......................................................... 415/175
See application file for complete search history.

(56) References Cited

U.S. PATENT DOCUMENTS

| 2,668,596 A | 2/1954 | Elliott |
| 2,681,191 A | 6/1954 | Elliott |

(Continued)

FOREIGN PATENT DOCUMENTS

| FR | 2 951 502 A1 | 4/2011 |
| FR | 3 018 857 A1 | 9/2015 |
| FR | 3 021 628 A1 | 12/2015 |

OTHER PUBLICATIONS

U.S. Appl. No. 14/423,801, filed Feb. 25, 2015, 2015/0204246 A1, Jordane Peltier, et al.

(Continued)

*Primary Examiner* — Long T Tran
*Assistant Examiner* — James J Kim
(74) *Attorney, Agent, or Firm* — Oblon, McClelland, Maier & Neustadt, L.L.P.

(57) ABSTRACT

The main purpose of the invention is an air circulation device (1) for a turbomachine (10), comprising an air conveyance circuit (2, 4b, 9, 4a, 3) adapted to bring hot bleed air (A1) from the turbomachine (10) to a part to be heated (38), comprising a first segment fixed in rotation to a rotating part (31, 24) and comprising at least one hot air (A2) conveyance conduit (3, 9), and a hot air passage device (4a, 4b), comprising an annular compartment fixed in rotation to the first segment, characterise in that the annular compartment comprises a heat exchanger in contact with external air, and in that the hot air passage device (4a, 4b) comprises a hot air bypass system to deviate air entering into the device and to make it circulate along the heat exchanger when the temperature of this intake air is above a predetermined threshold.

15 Claims, 9 Drawing Sheets

(51) Int. Cl.
    *F02K 3/02* (2006.01)
    *F02C 7/047* (2006.01)
    *F02C 7/14* (2006.01)
    *F02C 7/18* (2006.01)
    *F02C 9/18* (2006.01)

(52) U.S. Cl.
    CPC ............... *F02C 9/18* (2013.01); *F02K 3/025* (2013.01); *F05D 2220/324* (2013.01); *F05D 2260/213* (2013.01)

(56) References Cited

U.S. PATENT DOCUMENTS

| | | | | |
|---|---|---|---|---|
| 4,936,748 | A * | 6/1990 | Adamson | ............... F02C 6/206 |
| | | | | 416/123 |
| 5,841,079 | A | 11/1998 | Parente | |
| 7,716,913 | B2 * | 5/2010 | Rolt | ....................... B64D 33/08 |
| | | | | 60/226.1 |
| 7,966,833 | B2 | 6/2011 | Beutin et al. | |
| 8,534,077 | B2 | 9/2013 | Beutin et al. | |
| 10,036,329 | B2 * | 7/2018 | Suciu | ..................... F02K 3/115 |
| 2011/0167835 | A1 * | 7/2011 | Beutin | ................... F01D 15/10 |
| | | | | 60/802 |
| 2013/0186102 | A1 * | 7/2013 | Lo | ............................ F02C 7/18 |
| | | | | 60/785 |

OTHER PUBLICATIONS

French Preliminary Search Report dated Jan. 4, 2017 in French Application 16 53817 filed on Apr. 28, 2016 (with English Translation of Categories of Cited Documents).

\* cited by examiner

AIR CIRCULATION DEVICE FOR A TURBOMACHINE COMPRISING A HOT AIR BYPASS SYSTEM TO A HEAT EXCHANGER

TECHNICAL DOMAIN

This invention relates to the general domain of turbomachines, and more particularly to the domain of turbomachine architectures designed to enable air circulation in a turbomachine, particularly through an interface with a rotating part of the turbomachine. The invention also relates to the domain of deicing and/or antifreeze systems for such turbomachines, particularly at any upstream part of a turbomachine exposed to frost.

The invention is applicable to all types of land or aeronautical types of turbomachines, and particularly to aircraft turbomachines such as turbojets and turboprops. More specifically, the invention has a preferred application in the domain of turbomachines for aircraft comprising at least one open rotor propeller, and also two co-rotating or contra-rotating open rotor propellers, this type of turbomachine also being called "open rotor" and "propfan".

The general architecture of an "open rotor" type turbomachine is different from the architecture of a conventional turbomachine due to the special arrangement of the fan located outside the turbomachine fairing. More precisely, a distinction is made between two types of open rotor turbomachines, namely open rotor pushers and open rotor pullers.

In the case of an open rotor pusher type turbomachine, the rotating propeller or the co-rotating propellers or the contra-rotating propellers are located downstream from the turbomachine, in other words behind the turbomachine along the direction of displacement of the aircraft.

In the case of an open rotor puller type turbomachine, the rotating propeller or the co-rotating or contra-rotating propellers are located upstream from the turbomachine, in other words further forwards.

Preferably, the invention is applicable to a turbomachine comprising at least one propeller installed on the upstream side of a gas generator and functioning in traction, and particularly to a open rotor puller type of turbomachine.

The invention relates more precisely to an air circulation device comprising at least one hot air bypass system to at least one heat exchanger, and a turbomachine comprising such a device.

STATE OF PRIOR ART

Note that throughout this description, the terms upstream and downstream should be understood with reference to a principal normal direction of gas flow (from upstream to downstream) for a turbomachine 10. Furthermore, the radial axis of symmetry of the turbomachine 10 is called the axis T of the turbomachine 10. The axial direction of the turbomachine 10 corresponds to the rotation axis T of the turbomachine 10. A radial direction of the turbomachine 10 is a direction perpendicular to the axis T of the turbomachine 10.

Furthermore, unless mentioned otherwise, the adjectives and adverbs axial, radial, axially and radially are used with reference to the above mentioned axial and radial directions. Furthermore, unless mentioned otherwise, the terms inner and outer are used with reference to a radial direction such that the inner part of an element is closer to the axis T of the turbomachine 10 than the outer part of the same element.

FIG. 1 is an axial section diagrammatically and partially showing an example of a open rotor puller type of turbomachine 10 with a pair of contra-rotating propellers according to an embodiment in prior art, as described in French patent application FR 2 951 502 A1, and is in no way limitative.

The turbomachine 10 comprises a pair of contra-rotating propellers, the upstream propeller 11 and the downstream propeller 12, these propellers being mounted upstream from a gas generator 13 and therefore working by pulling, since in a way the propellers pull the turbomachine, most of which is positioned downstream from the propellers. In a manner known in itself, the gas generator 13 comprises, in order from the upstream end to the downstream end, a low pressure compressor 14, a high pressure compressor 15 (shown on FIG. 1), a combustion chamber, a high pressure turbine and an intermediate pressure turbine (not shown on FIG. 1). The low pressure compressor 14 and the intermediate pressure turbine are mechanically connected through a first shaft to form a low pressure case, while the high pressure compressor 15 and the high pressure turbine are mechanically connected by a second shaft to form a higher pressure case.

A free power turbine is mounted downstream from the intermediate pressure turbine to drive the propellers 11 and 12 under the effect of gases from the intermediate pressure turbine, through a third shaft (not shown on FIG. 1).

The compressors, the combustion chamber and the gas generator turbines 13 jointly delimit an annular primary airflow 16 of the turbomachine 10, usually called the core engine airflow.

The propellers 11 and 12 may for example be driven by a planetary reduction gearset 17 in which the sungear, centred on the longitudinal axis T of the turbomachine 10, is connected through the third shaft to the free power turbine, of which the ring gear is connected to an inner hub 18 of the downstream propeller 12, and the sungear holder of which is connected to an internal hub 19 of the upstream propeller 11.

The inner hub 18 of the downstream propeller 12 comprises a radially outer aerodynamic surface 20 that prolongs an upstream outer surface 21 of a case 21 of the reduction gear 17 in the upstream direction. This inner hub 18 includes a plurality of oblique connecting arms 23 distributed about the axis T of the turbomachine 10 connecting the hub 18 to an aerodynamic annular case 24 of the downstream propeller 12.

The aerodynamic case 24 comprises an inner surface 25 and an outer surface 26, both of which are surfaces of revolution about the axis T of the turbomachine 10, and includes support means 27 for the blades 28 of the downstream propeller 12, that advantageously comprises a known type of pitch control device for this propeller 12, to adapt the incidence of the blades 28 to the operating speed of the turbomachine 10.

Similarly, the inner hub 19 of the upstream propeller 11 comprises a radially outer aerodynamic surface 29 that prolongs the aerodynamic surface 20 of the hub 18 of the downstream propeller 12 in the upstream direction, and includes a plurality of oblique connecting arms 30 connecting it to an aerodynamic annular case 31 of the upstream propeller 11.

The aerodynamic case 31 comprises an inner surface 32 and an outer surface 33 of revolution about the axis T of the turbomachine 10 and prolonging the inner surface 25 and outer surface 26 respectively of the aerodynamic case 24 of the downstream propeller 12, in the upstream direction. This aerodynamic case 31 includes support means 34 for the blades 35 of the upstream propeller 11, that may for example be similar to the support means 27 described above.

Furthermore, in this example, the turbomachine 10 comprises an annular air circulation channel 36 delimited on the inside by aerodynamic surfaces 20 and 29 of the hubs 18 and 19 respectively of the upstream and downstream propellers 11 and 12 respectively, and by an inlet cone 37 extending to the upstream end of the hub 19 of the upstream propeller 11. This air circulation channel 36 is delimited externally by internal surfaces 25 and 32 of the aerodynamic cases 24 and 31 respectively of propellers 12 and 11 respectively. In particular, since the input cone 37 is offset in the downstream direction relative to the upstream end 38 of the aerodynamic case 31 of the upstream propeller 11, this end 38 forms an intake duct for the air circulation channel 36.

The air circulation channel 36 communicates with an intake of the core engine airflow 16 of the gas generator 13, the inner surface of this intake being delimited by a downstream outer surface 39 of the case 22 of the mechanical propeller drive reduction gear 17 tapered inwards in the downstream direction, and the outer surface being delimited by a part of the upstream end 40 of an outer case 41 of the low pressure compressor 14 of the gas generator 13, tapered outwards in the upstream direction.

The upstream end of the air circulation channel 36 thus forms an air intake 42 to supply air for the core engine airflow 16, to which this intake is connected through the circulation channel 36.

According to the terminology used above, the case 22 of the mechanical reduction gear 17 forms part of an upstream internal static structure of the turbomachine 10, on which the propellers 11 and 12 are mounted free to rotate.

Furthermore, the inner surface 25 of the aerodynamic case 24 of the downstream propeller 12 comprises a downstream part 43 tapered outwards in the downstream direction, and delimiting the outer surface of an annular foreign object ejection channel 44, for example for the ejection of birds or ice. The inner surface of this ejection channel 44 is delimited by a tapered wall 45 with a section diverging in the downstream direction, the upstream end of which is connected to the upstream end of the upstream part 40 of the outer case 41 of the low pressure compressor 14, to form an annular flow splitter 46 separating the ejection channel 44 from the core engine airflow. The ejection channel 44 opens up radially outwards, downstream from the aerodynamic case 24 of the downstream propeller 12 and has an outlet opening formed circumferentially by several channels.

Furthermore, the upstream part 40 of the outer case 41 of the low pressure compressor 14 is connected to the case 22 of the mechanical reduction gear 17 by structural arms 47.

During operation, this turbomachine 10 might be affected by the formation of frost or even ice at its air intake 42, particularly at the upstream end 38 of the aerodynamic case 31 of the upstream propeller 11, also called the lip 31 of the air intake 42, or on the intake cone 37 extending to the upstream end of the hub 19 of the upstream propeller 11. The formation of frost or ice can then create a risk of damage to the upstream propeller 11 and the downstream propeller 12, in case of impacts on them, and a risk of ingestion of frost or ice among other materials into the turbomachine 10.

Appropriate de-icing means capable of heating surfaces exposed to frost upstream from the turbomachine 10, and particularly the outer surface of the lip 38, have to be provided so as to be able to prevent the formation and accumulation of frost.

Solutions have been proposed consisting of bringing a hot air flow onto the surfaces to be heated to deice part of the turbomachine, for example at the air intake. In particular, the solution described in the patent application of the Applicant published as number FR 3 021 628 A1 includes an air conveyance circuit comprising at least one rotating segment to route hot bleed air from the turbomachine as far as an air intake lip into the turbomachine, the circuit including sealed devices for the passage of air between two segments rotating relative to each other.

Furthermore, American patent U.S. Pat. No. 2,668,596 A also describes a gas turbine engine housed in a pod in which hot gas is extracted from a gas outlet unit to feed the air intake, to reduce the formation of frost. Hot gas derived from the gas discharge unit circulates through several elements rotating relative to each other to feed the air intake through orifices.

Furthermore, hot air deicing devices have also been designed in other known devices such as "swirl" or "piccolo" type devices: the "swirl" device is based on circumferential ejection in an annular cavity of a hot air jet circulating along the cavity, such a device for example being disclosed in American patent U.S. Pat. No. 4,688,745 A; the "piccolo" device consists of directing hot air in an perforated annular tube that creates a multitude of jets that impact the wall at appropriate locations so as to increase the efficiency of deicing, such a device for example being disclosed in American patent U.S. Pat. No. 5,841,079 A.

As is made clear particularly in FR 3 021 628 A1, the installation of deicing means must take account of the rotating nature of the open rotor, and in particular, with reference to his FIG. 1, its contra-rotating nature for the case of upstream 11 and downstream 12 propellers for the circulation of hot air to the lip 38 of the turbomachine 10.

Furthermore, in order to deice an upstream part of the turbomachine, and particularly the air intake of the turbomachine, it is necessary to allow for the fact that bleed air from the turbomachine, for example from a compressor stage, can be very hot depending on operating conditions. In particular, at relatively high engine speeds, the high temperature of bleed air can cause damage to the upstream part to be deiced, and in particular can cause damage to the lip 38 of the air intake 42.

PRESENTATION OF THE INVENTION

The purpose of the invention is thus to at least partially overcome the needs described above and the disadvantages of embodiments according to prior art.

In particular, the invention aims to allow the passage of air, particularly deicing or anti-icing air, through at least one rotating part of the turbomachine in the upstream direction of the turbomachine, while enabling regulation of the air flow and/or temperature particularly as a function of operating phases of the turbomachine.

The purpose of one aspect of the invention is thus an air circulation device for a turbomachine, particularly for deicing and/or anti-icing air, comprising an air conveyance circuit adapted to bring hot bleed air from the turbomachine, for example from a compressor stage and particularly a high pressure stage of the turbomachine, to a part of the turbomachine to be heated and particularly a part to be deiced, particularly an upstream part subject to icing, for example an intake cone of the turbomachine or an outer wall of the turbomachine, in particular the wall forming the annular air intake lip of the turbomachine, said conveyance circuit comprising:

a first segment fixed in rotation to a rotating part of the turbomachine and comprising at least one hot air conveyance conduit, and a hot air passage device, comprising an annular compartment fixed in rotation to the first segment, characterised in that the annular compartment comprises at least one heat exchanger in contact with air external to the turbomachine, and in that the hot air passage device comprises at least one hot air bypass system adapted to deviate air entering into the hot air passage device and to make it circulate along the heat exchanger when the temperature of this intake air is above a predetermined threshold.

The invention makes it possible to allow the circulation of hot air through the turbomachine, for example for deicing and/or anti-icing, particularly an upstream part of the turbomachine on which icing might occur, while allowing regulation of the hot air flow and temperature, particularly to minimise potential damage to said upstream part of the turbomachine. Thus, as will become clear from the following description, the invention makes it possible for example to pass hot bleed air from a high pressure compressor stage through a rotating partition or several rotating partitions, particularly co-rotating or contra-rotating partitions, of the turbomachine to supply hot air to the upstream part, and particularly the annular air intake lip to the turbomachine, for deicing and anti-icing purposes, while minimising any damage to the lip by means of hot air flow and temperature regulation. Thus, in the case of an "open rotor puller" type turbomachine like that described above, the invention can prevent or at least limit the formation of frost or ice that could damage the propellers of the turbomachine. Another purpose of the invention can also limit distortion of the turbomachine air intake in the case of frost.

The air circulation device according to the invention may also comprise one or several of the following characteristics taken in isolation or in any technically possible combination.

Said at least one heat exchanger may be of the air/air type.

Heat exchange fins on said at least one heat exchanger can be arranged along an axial or radial direction.

The air conveyance circuit may include a second segment rotating relative to the first segment, and the hot air passage device may form a fluid connection between the first and the second segments.

The hot air passage device may also include:

an air intake cavity, an intermediate cavity located in the annular compartment, adjacent to the heat exchanger and that can be brought into fluid communication with the intake cavity by the bypass system such that hot air circulates in contact with the heat exchanger to be cooled, and an air outlet cavity that can be brought selectively into fluid communication with the air intake cavity or with the intermediate cavity by a system that actuates the bypass system capable or reacting to a physical parameter related to the temperature of the hot bleed air from the turbomachine.

The actuation may be self-contained and be energised by the physical parameter to which it reacts.

Hot air can be bled from a compressor of the turbomachine and the physical parameter related to the temperature of the hot bleed air can be the pressure of this air.

As a variant, hot air can be bled from a compressor of the turbomachine and the physical parameter related to the temperature of the hot bleed air can be the centrifugal force applied on the actuation device due to rotation of a part of the turbomachine with which the actuation device is fixed in rotation.

The actuation device may include a mobile bypass element and a return element applying a predetermined return force on the mobile bypass element.

As a result, this predetermined return force can be permanently applied to the mobile bypass element. The return device may for example by an elastic return device such as a spring, and for example a linear spring or a spiral spring, or another type of spring. The return device may also include pneumatic return means. Obviously, any other type of return could be envisaged.

The mobile bypass element could particularly be in the form of a piston, particularly located in the intake cavity.

The mobile bypass element could also be in the form of a valve free to pivot about a hinge pin, particularly force fitted onto the intake cavity.

The annular compartment can also comprise a non-return valve positioned in the fluid path between the intermediate cavity and the outlet cavity, preventing any air passage from the outlet cavity to the intermediate cavity.

The heat exchanger can include a radially outer annular compartment sealing wall and fins formed on an outer face and on an inner face of this wall.

The hot air passage device can include several bypass systems at a circumferential spacing from each other. Each bypass system can be associated with a heat exchanger extending over almost all or part of the circumferential space between the bypass system and an adjacent bypass system.

The second segment can be fixed in the turbomachine, and hot air can circulate from the second segment to the first segment.

The hot air passage device may include an annular connection conduit communicating with the annular compartment, and a sealing system connecting the annular connection conduit to an annular conduit fixed to the second segment.

The purpose of another aspect of the invention is a turbomachine, characterised in that it comprises an air circulation device like that defined above, and a gas generator, at least one rotating part of the turbomachine comprising an open rotor propeller or a pair of co-rotating or contra-rotating propellers, installed upstream from the gas generator. In other words, the turbomachine may be of the "open rotor puller" type as described above.

The air circulation device and the turbomachine according to the invention may include any of the characteristics mentioned in this description, taken in isolation or in any technically possible combination with other characteristics.

BRIEF DESCRIPTION OF THE DRAWINGS

The invention will be better understood after reading the following detailed description of non-limitative example embodiments of it, and after studying the diagrammatic and partial figures in the appended drawing, on which.

In all these figures, identical references may denote identical or similar elements.

Moreover, the different parts shown on the figures are not necessarily all at the same scale, to make the figures more easily understandable.

DETAILED PRESENTATION OF PREFERRED EMBODIMENTS

Figure 1:
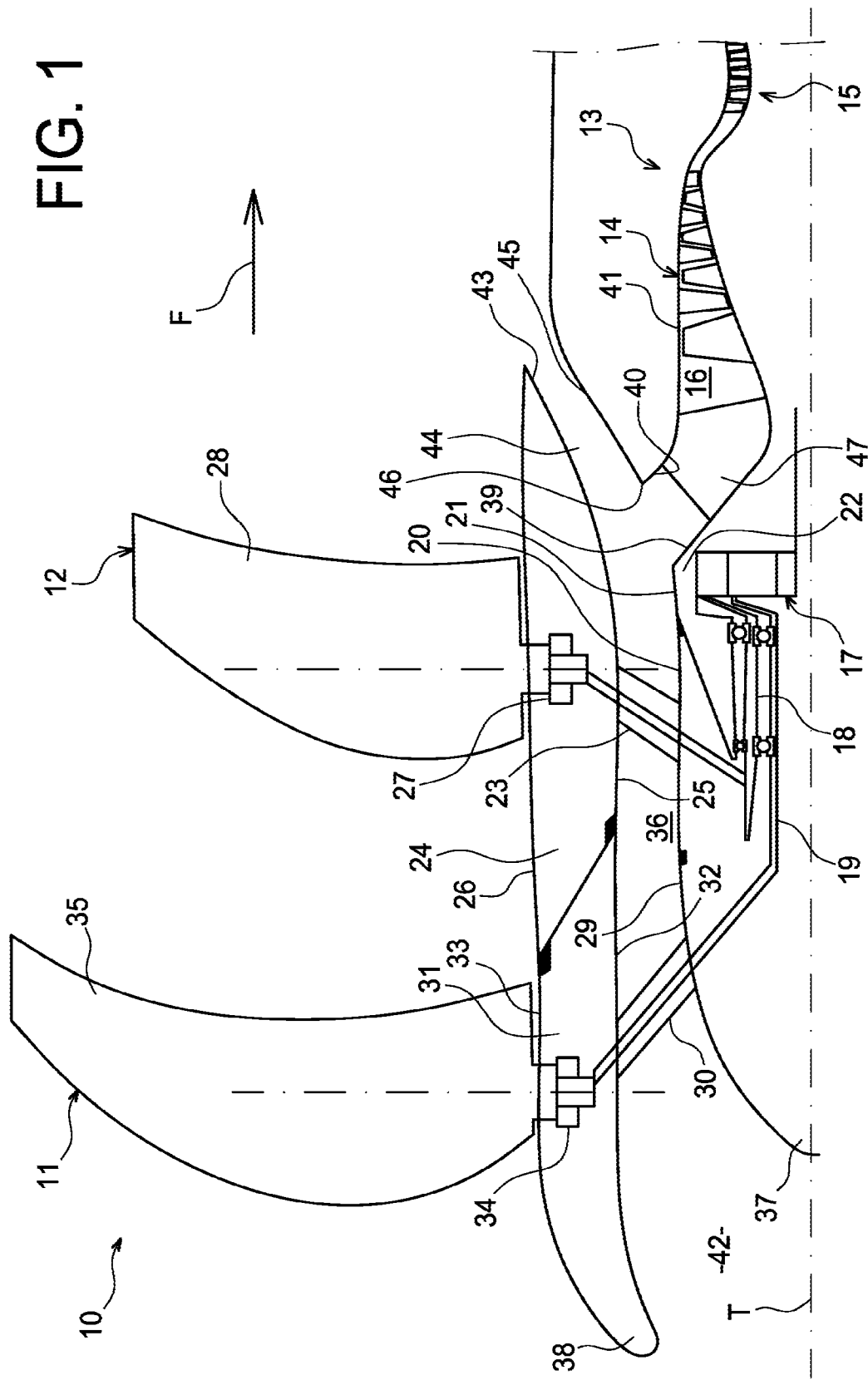
FIG. 1 contains an axial section through an example turbomachine comprising a pair of contra-rotating open rotor puller type propellers according to prior art FIG. 2 contains an axial section through an example turbomachine with a pair of contra-rotating open rotor puller type propellers comprising an air circulation device according to the invention

FIG. 1 has already been described in the part describing the state of prior art.

Figure 2:
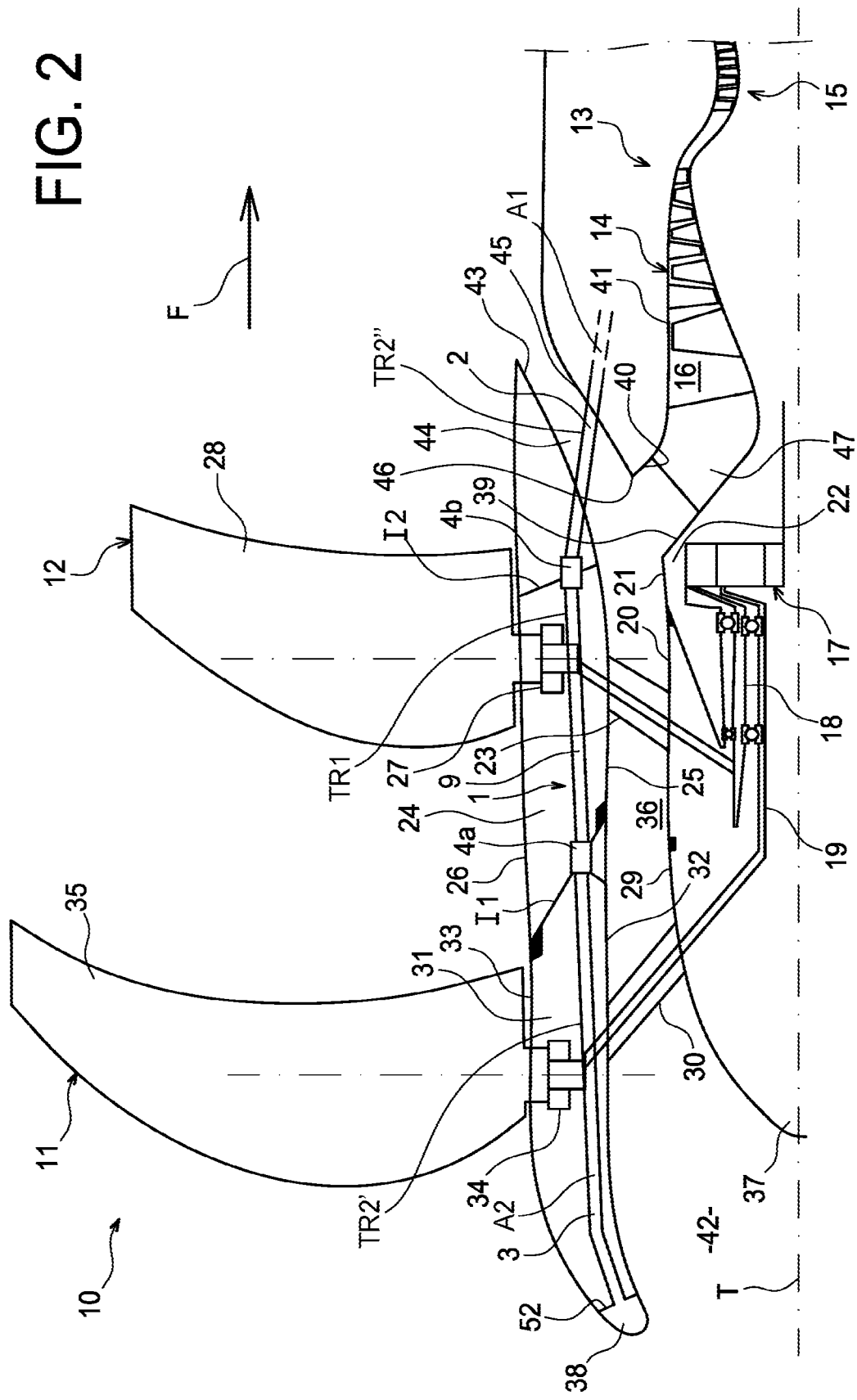

FIG. 2 illustrates an example embodiment of an air circulation device 1 according to the invention on a turbomachine 10.

More precisely, FIG. 2 represents an axial sectional view of the turbomachine 10 equipped with the air circulation device 1 according to the invention. On this FIG. 2, elements common with the elements described above with reference to FIG. 1 are not described again. It should be noted that in this example, the aerodynamic annular case 24 of the downstream propeller 12 is distinct from and rotates relative to the downstream part 43 that forms an aerodynamic annular stator case 43 and forms the outer surface delimiting the annular foreign bodies ejection channel. In other words, the turbomachine 10 comprises an aerodynamic annular case 31 of the upstream propeller 11 and an aerodynamic annular case 24 of the downstream propeller 12 that are contra-rotating; the casing 24 being free to rotate relative to the aerodynamic annular stator case.

With reference to FIG. 2, the turbomachine 10 is of the "open rotor puller" type as described above, comprising a pair of open rotor propellers, the upstream propeller 11 and the downstream propeller 12, installed upstream from the gas generator 13 of the turbomachine 10 and therefore working by pulling.

The turbomachine 10 comprises an air circulation device 1 conforming with the invention, installed between the annular lip 38 of the air intake 42 to the turbomachine 10 and a high pressure compressor stage 14 (the connection to the high pressure compressor stage 14 is not shown).

More precisely, the device 1 is used to bleed hot air A1 from the high pressure compressor stage 14, and to output it to the annular lip 38 of the air intake 42 to perform de-icing and/or anti-icing.

The device 1 passes through two rotating parts of the turbomachine 10, contra-rotating relative to each other, between the annular lip 38 of the air intake 42 and the high pressure compressor 14. A first rotating part 31 is composed of the aerodynamic annular case 31 of the upstream propeller 11, and a second rotating part 24 is composed of the aerodynamic annular case 24 of the downstream propeller 12. The device 1 also passes through a fixed part 43 composed of the aerodynamic stator annular case 43.

Advantageously, the device 1 according to the invention is designed to enable the passage of hot air A1 from the high pressure compressor 14 through the different rotating partitions of these parts 31, 24, 43 that form the upstream parts of the "open rotor puller" type of turbomachine 10. The hot air conveyance circuit through the various rotating partitions to an upstream part of the turbomachine 10 to be heated is manufactured based on the same principle as that described in publication FR 3 021 628 A1 by the Applicant.

Thus, as can be seen on FIG. 2, the device 1 comprises a first segment TR1 fixed in rotation with the second rotating part 24, comprising a hot air A3 circulation conduit 9, or intermediate conduit 9. The device 1 also comprises a second upstream segment TR2', fixed in rotation to the first rotating part 31, comprising a hot air A2 conveyance conduit 3 for de-icing and/or anti-icing of the annular lip 38, and a second downstream segment TR2'', fixed to the fixed part 43, comprising a hot air A1 bleed conduit 2 from the high pressure compressor stage 14.

There is a first hot air passage device 4a between the hot air bleed conduit 2 and conveyance conduit 3, formed at the interface 11 between the first part 31 and the second part 24 of the turbomachine 10, and a second hot air passage device 4b, formed at the interface 12 between the second rotating part 24 and the fixed part 43 of the turbomachine 10. The first hot air passage device 4a is connected to the second hot air passage device 4b through a first segment TR1, comprising a hot air A3 circulation conduit 9 or intermediate conduit 9.

Furthermore, the hot air A2 conveyance conduit 3 of the device 1 opens up at the annular lip 38 of the turbomachine 10 to enable de-icing and/or anti-icing of the lip through an air intake partition 52. The hot air A1 bleed conduit 2 is located relative to the high pressure compressor 14 such that hot air A1 can be bled from the high pressure compressor stage 14.

Furthermore, according to the invention, each of the first hot air passage device 4a and the second hot air passage device 4b comprises means of regulating the temperature and/or flow of the hot air flow entering these devices. These means are designed particularly to cool hot air as it passes through the interfaces 11 and 12 between the first rotating part 31 and the second rotating part 24 of the turbomachine 10, and between the second rotating part 24 and the fixed part 43 of the turbomachine 10, respectively, through regulation systems described below such that hot air can be cooled by means of one or several heat exchangers as a function of the rotation speed of the propellers 11 and 12 and particularly as a function of the operating speed of the turbomachine 10.

Figure 3:
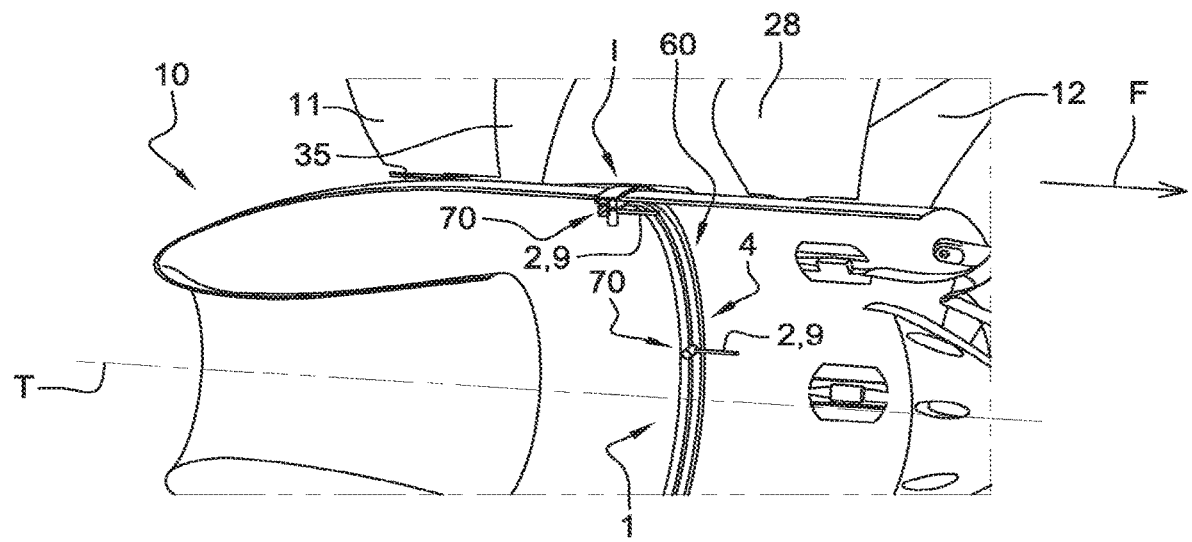
FIG. 3 shows a partial axial section illustrating an example turbomachine with a pair of contra-rotating open rotor puller type propellers comprising an air circulation device according to the invention, comprising an annular compartment with a mobile bypass element in form of a so-called "vertical" piston.
Figure 7:
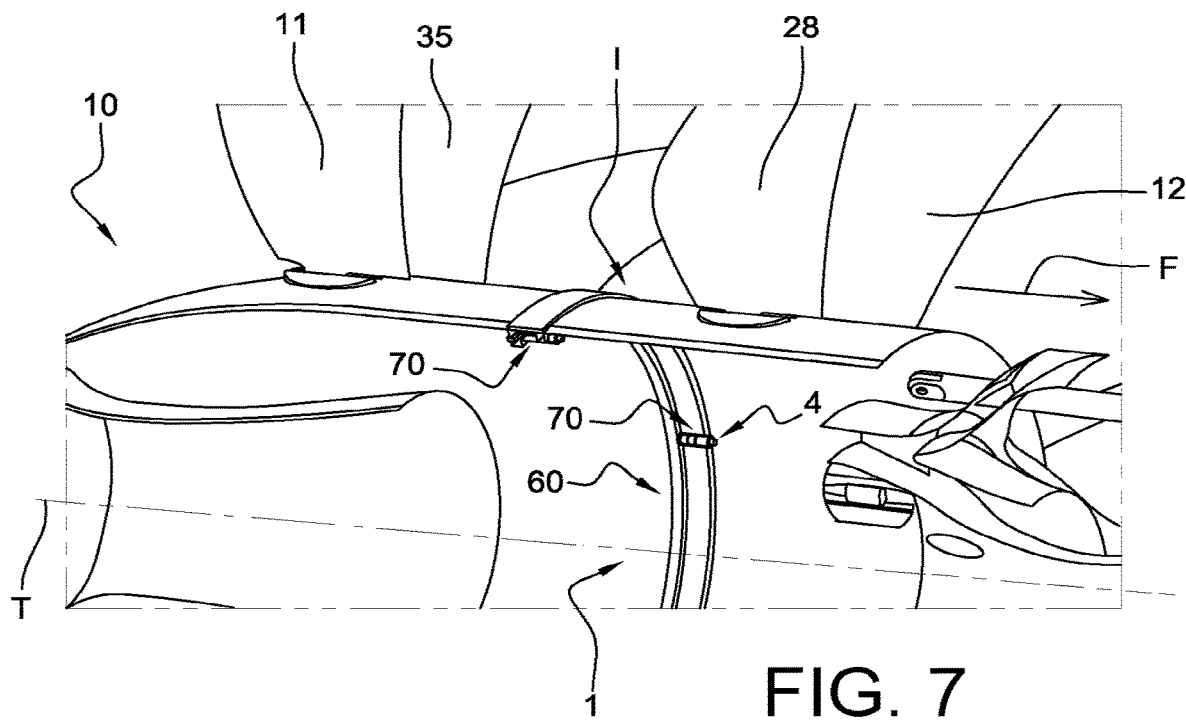
FIG. 7 shows a partial axial section illustrating another example turbomachine with a pair of contra-rotating open rotor puller type propellers comprising an air circulation device according to the invention, comprising an annular compartment with a mobile bypass element in form of a so-called "horizontal" piston.

FIGS. 3 and 7 are partial axial sectional views illustrating two distinct examples of a turbomachine 10 with a pair of open puller type contra-rotating propellers 11 and 12, each comprising an air collection device 1 according to the invention at the interface I between the two rotating parts.

These two examples of a turbomachine 10 are different in that, in the example embodiment in FIG. 3, the annular compartment 60 of the hot air passage device 4 comprises a mobile bypass element in the form of a so-called "vertical" piston, while in the example embodiment in FIG. 7, the annular compartment 60 of the hot air passage device 4 comprises a mobile bypass element in the form of a so-called "horizontal" piston. These differences will be explained below.

For both of the example embodiments in FIGS. 3 and 7, each air circulation device 1 comprises a hot air passage device 4 comprising an annular compartment (or housing) 60 for the circulation of hot air.

This annular compartment 60 is mounted at the interface I, either at a partition crossing between two parts of the turbomachine 10, and extends 360° around the rotation axis T of the turbomachine 10 being supplied with hot air downstream. Obviously, it would also be possible to provide an annular compartment extending around less than 360°. For example, the annular compartment may be composed of two separate diametrically opposite portions, each portion forming a circle arc of less than 180°, or even less than 90°.

Advantageously and according to the invention, each annular compartment 60 comprises a plurality of hot air bypass systems, also designated by the term "bypass systems 70". The number of bypass systems 70 can be variable, and particularly can be determined as a function of the required hot air flow and/or temperature regulation. Obviously, it will also be possible to provide a single hot air bypass system 70 into an annular compartment 60.

As shown partially on FIGS. 3 and 7, in particular each annular compartment 60 can comprise four bypass systems 70, particularly distributed uniformly around the annular compartment 60, therefore at 90° intervals.

These bypass systems 70 are located particularly at each conduit 2, 9 (partially represented on FIG. 3), that can correspond to a hot air A1 bleed conduit 2 or an hot air intermediate circulation or conveyance conduit 9, and advantageously guide entering hot air towards the upstream side of the annular compartment 60, or to a cooling system comprising one or several heat exchangers 64.

Advantageously, the principle of the annular compartment 60 fitted with a plurality of hot air bypass systems 70 is based on an entirely mechanical and self-contained principle, as is described in the following description, in other words in particular without electrical actuation or actuation by remote control, unlike for example bleed air bypass solenoid valves that would be controlled as a function of the temperature of this air measured by a sensor. Furthermore, since such bypass systems 70 can preferably be installed on one or more rotating parts of the turbomachine 10, their independence can make it possible to avoid the obligation to make a solenoid valve electrical power supply circuit, which would be difficult in practice between a fixed part and a rotating part of the turbomachine and would increase the cost and weight of the system.

Furthermore, FIGS. 4A-4B, 5A-5B and 6 illustrate various operating modes of the turbomachine 10 represented on FIG. 3, and FIGS. 8A-8B and 9A-9B illustrate various operating modes of the turbomachine 10 in FIG. 7. Their specific features will be described later.

With reference to these FIGS. 4A to 9B, each annular compartment 60 of a hot air passage device 4 comprises a hot air inlet cavity 61, that comprises a plurality of hot air inlet orifices 6 to connect the plurality of hot air inlet conduits 2, 9 to the annular compartment 60.

Furthermore, each annular compartment 60 of a hot air passage device 4 also comprises a hot air outlet cavity 63, that comprises a plurality of hot air outlet orifices 8 to connect the plurality of hot air outlet conduits 3, 9 to the annular compartment 60.

Note that in the example embodiments described herein, the inlet conduits 2, 9 are directly connected to the inlet orifices 6 and therefore to the annular compartments 60 of the hot air passage devices 4. Similarly, the outlet ducts 3, 9 are directly connected to the outlet orifices 8 and therefore to the annular compartments 60 of the hot air passage devices 4. As a variant, and as shown in dashed lines on FIG. 4B, each inlet conduit 2, 9 or outlet conduit 3, 9 can be connected to the annular compartment 60 of a hot air passage device 60 of a hot air passage device 4 through a sealing system SE. Thus, each hot air passage device 4 can comprise a first annular conduit CA1 and/or a second annular conduit CA2 communicating with the annular compartment 60, connected to an inlet conduit 2, 9 and/or an outlet conduit 3, 9 by means of a sealing system SE.

More particularly, for an air passage 4a located between the second downstream segment TR2' and the first segment TR1, each outlet conduit 3 can be connected to a first annular conduit CA1 through a sealing system SE and each inlet conduit 9 may or may not be connected to a second annular conduit CA2 through another identical or similar sealing system SE.

For an air passage 4b located between the first segment TR1 and the second upstream segment TR2", each outlet conduit 9 may or may not be connected to a first annular conduit CA1 through a sealing system SE and each inlet conduit 2 may be connected to a second annular conduit CA2 through another sealing system SE.

Furthermore, each annular compartment 60 comprises an intermediate cavity 62 designed to be selectively in fluid communication with the inlet cavity 61 and with the outlet cavity 63, that can also be in fluid communication with each other. Inside this intermediate cavity 62, hot air comes into contact with a heat exchanger 64 formed on the external wall of the annular compartment 60, a radially outer wall of this heat exchanger 64 being in contact with air external to the turbomachine. The passage of hot air in contact with a radially inner wall of the heat exchanger 64 then enables cooling of the hot air before it enters the outlet cavity 63.

This heat exchanger 64 may comprise internal and/or external heat exchange fins. These fins can be arranged such that each is oriented along an axial direction (flow direction) or along a circumferential direction, or along a direction with an axial component and a circumferential component. Heat exchange in the intermediate cavity 62 may be more or less efficient depending on the direction of orientation of the fins.

It should also be noted that operating parameters of the annular compartment 60, such as the arrangement of mobile bypass elements 71, the arrangement and the shape of the fins of the heat exchanger 64, the diameter of the conduits 3, 9 or 2, the hot air circuit in the intermediate cavity 62, among other parameters, can be modified to obtain the required air flow and/or temperature regulation, and that deicing and/or anti-icing of an upstream part of the turbomachine 10 subject to icing can be done.

Another advantage of the position of the heat exchanger 64 could be to make it possible to create a hot air flow contributing to the protection of rotating covers against icing at the downstream propeller 12.

Figure 4A:
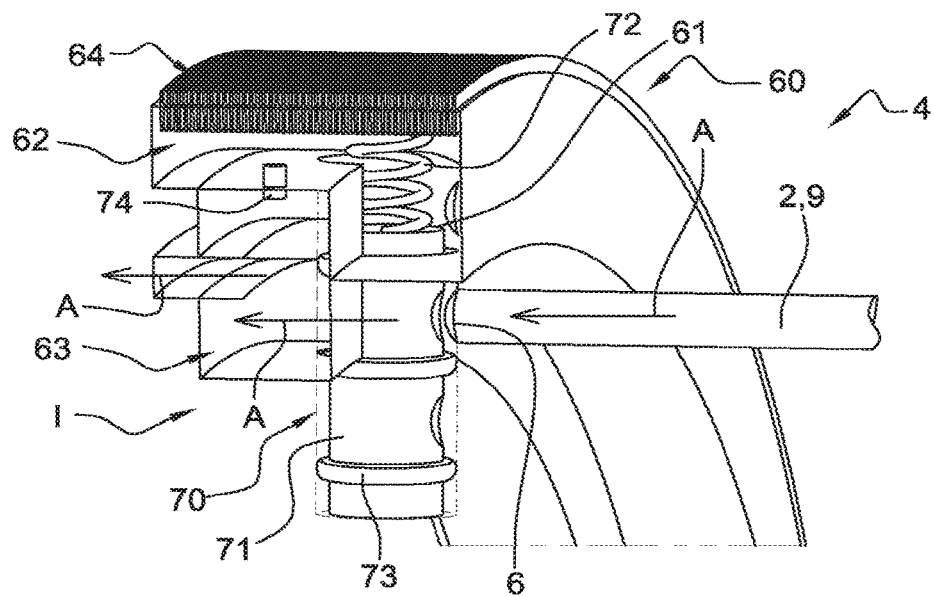
FIG. 4A contains a partial sectional perspective view, and FIG. 4B contains a diagrammatic axial sectional view representing the annular compartment of the turbomachine in FIG. 3 with a bypass system in a "low speed" phase, FIG. 5A contains a partial sectional perspective view, and FIG. 5B contains a diagrammatic axial sectional view representing the annular compartment of the turbomachine in FIG. 3 with a bypass system in a "high speed" phase, FIG. 6 contains a diagrammatic axial sectional view representing the annular compartment of the turbomachine in FIG. 3 with a bypass system in a "transient speed" phase.
Figure 4B:
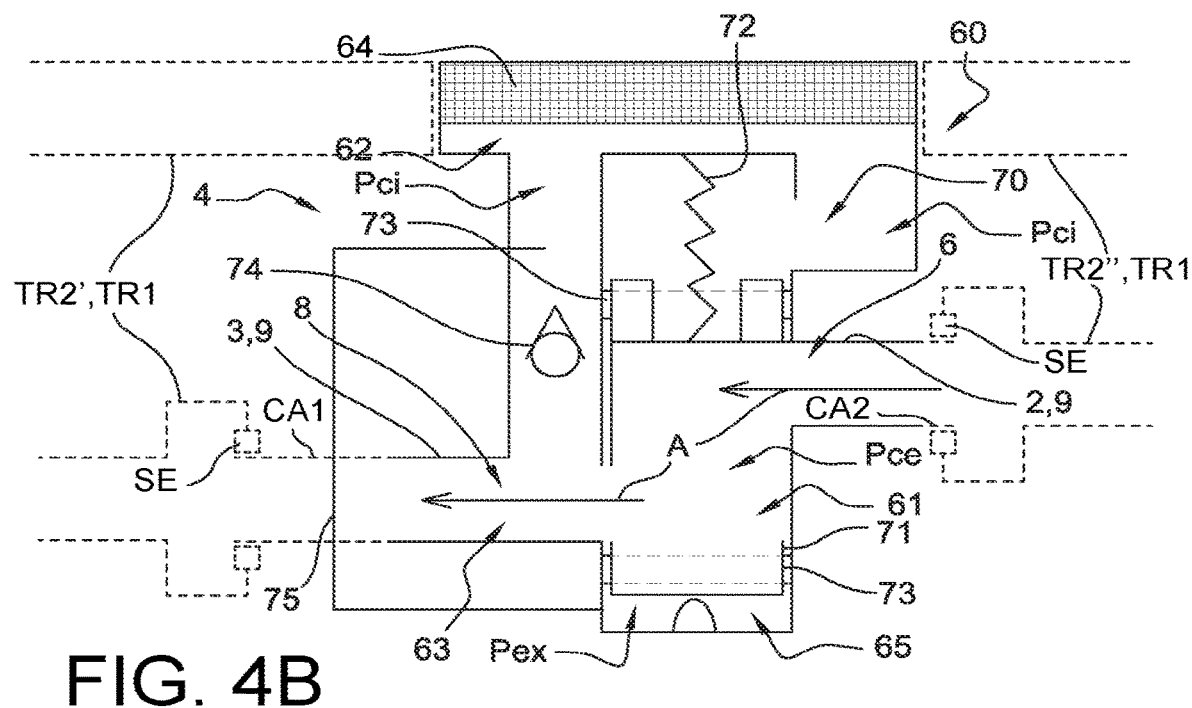
Figure 5A:
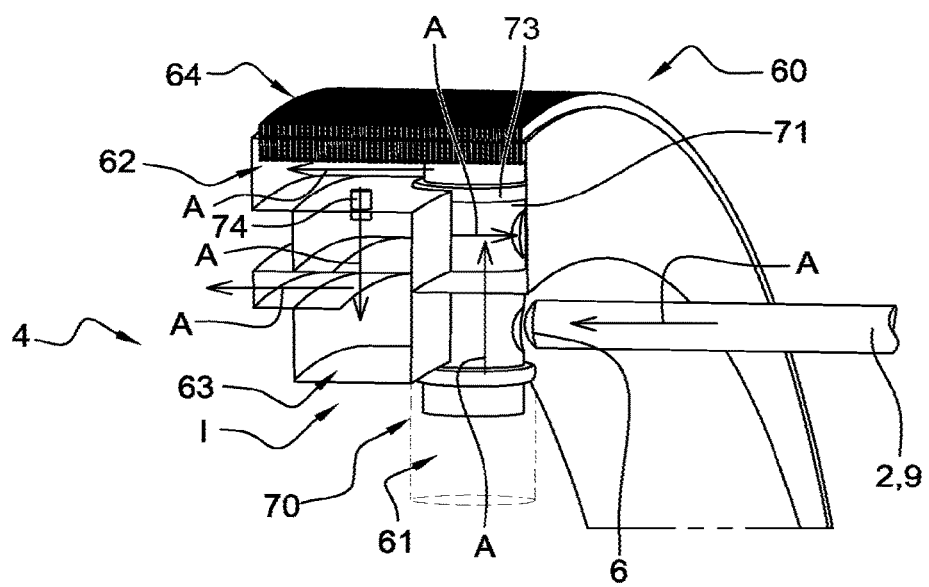
Figure 5B:
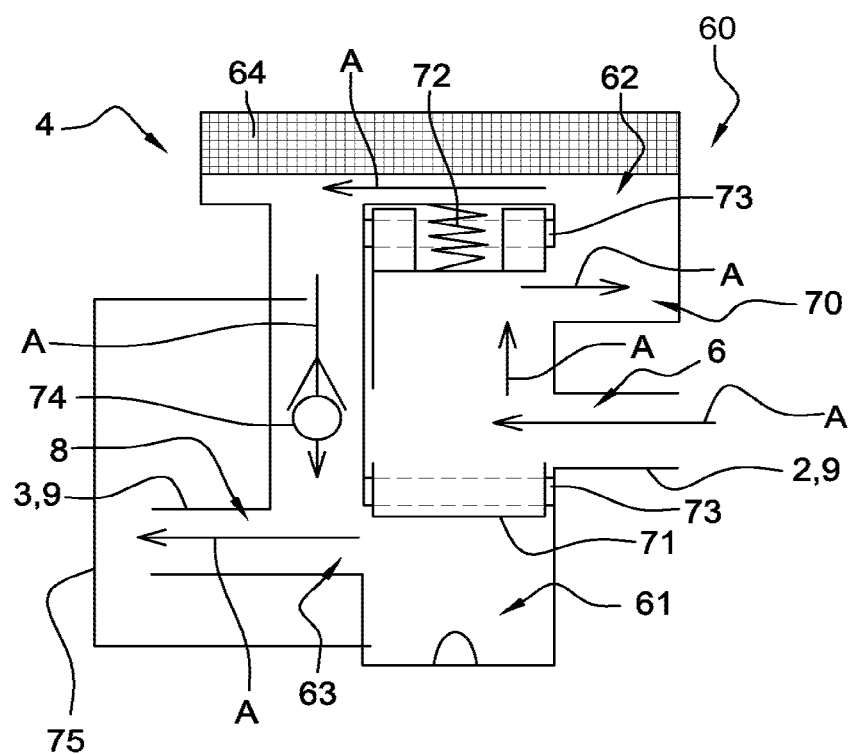
Figure 6:
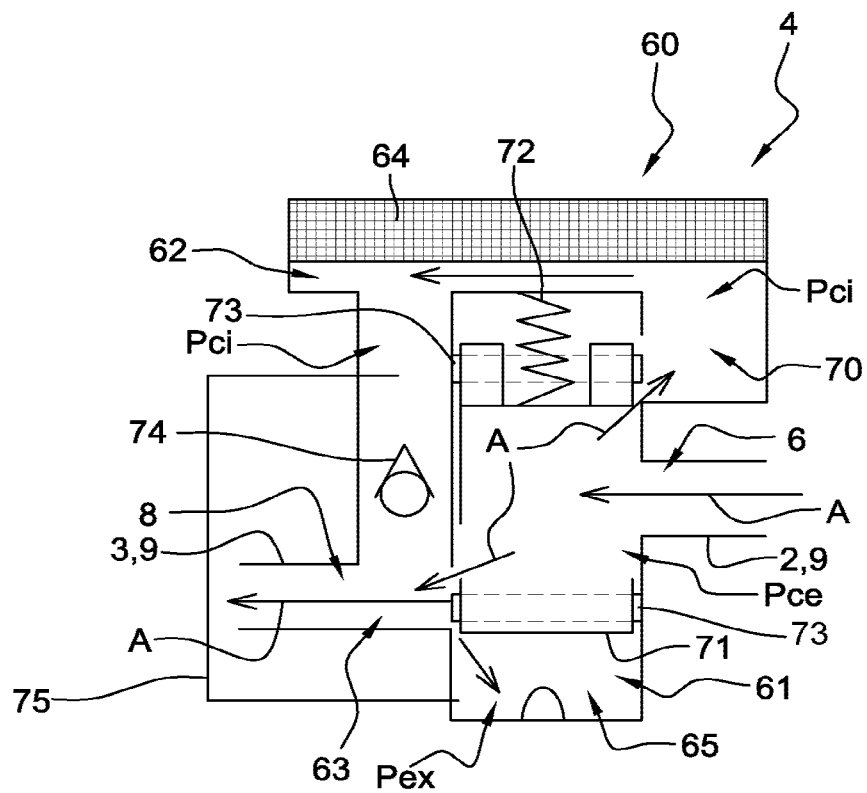

Furthermore, as can be seen particularly on FIGS. 4B, 5B and 6, each annular compartment 60 may include a non-return valve 74, placed in the fluid path between the intermediate cavity 62 and the output cavity 63.

This non-return valve 74 prevents any air passage from the output cavity 63 to the intermediate cavity 62.

For each annular compartment 60, it is also planned to add a sealing system between a mobile bypass element 71 and the associated inlet cavity 61, including a plurality of annular seals 73.

Moreover, as mentioned above, each annular compartment 60 comprises a plurality of bypass systems 70, each of which comprises an actuation device including a mobile bypass element 71 that can be moved relative to the associated inlet cavity 61 and is capable of putting this inlet cavity 61 into fluid communication with the intermediate cavity 62 and/or the outlet cavity 63, to enable regulation of the hot air temperature output from the annular compartment 60.

The mobile bypass elements 71 are all capable of being displaced relative to the inlet cavity 61 by reacting to a physical parameter related to the hot bleed air temperature A1 from the turbomachine 10. This physical parameter can consist of a centrifugal effect due to the rotation of part of the turbomachine with which the bypass system 70 is fixed in rotation, and/or the hot air pressure from the inlet conduits 2, 9. Advantageously, the actuation device for each bypass system 70 also includes a return element 72 applying a predetermined return force on the mobile bypass element 71. Thus, this predetermined return force can be permanently applied to the mobile bypass element 71. The return device 72 may for example be an elastic return device such as a spring, and for example a linear spring or a spiral spring, or another type of spring. The return device 72 may also include pneumatic return means. Obviously, any other type of return could be envisaged.

We will now describe two example designs of bypass systems 70, describing their operating methods with reference to FIGS. 4A to 9B. These two examples are common in that they include manufacturing of the mobile bypass element in the form of a piston 71, placed in the inlet cavity 61, and the presence of a elastic return device 72 applying an elastic return force on the piston 71, extending between a wall of the inlet cavity 61 and the piston 71.

Note that the characteristics described with reference to FIGS. 4A to 9B, and then with reference to FIGS. 10A and 10B dealing with a hot air passage device 4, can be located on the first hot air passage device 4a and/or on the second hot air passage device 4b, represented and described with reference to FIG. 2.

Furthermore, in all FIGS. 4A to 10B, the arrows A represent possible hot air pathways from when it penetrates into an annular compartment 60 until it exits from the annular compartment 60.

A first embodiment in which the piston 71 is said to be "vertical", in other words its largest dimension lies along a radial direction, will be described with reference to FIGS. 4A to 6.

Such a vertical piston 71 is characterised in that its operation depends on the centrifugal force applied on the turbomachine 10. More precisely, at high operating speeds, the centrifugal force is applied on the vertical piston 71 along the axial direction of the piston that is coincident with a radial direction. This centrifugal effect induces compression of the linear spring 72, and thus allows hot air to pass from the inlet cavity 61 to the intermediate cavity 62 to come into contact with the heat exchanger 64.

FIGS. 4A and 4B relate to a "low speed" operating mode of the turbomachine 10, in which hot air is transferred directly upstream from the turbomachine 10 without being cooled, in other words hot air exits from the annular compartment 60 without passing through the intermediate cavity 62 that contains the heat exchanger 64. FIGS. 5A and 5B relate to a "high speed" operating mode of the turbomachine 10, in which hot air passes through the heat exchanger 64 before arriving upstream from the turbomachine 10. Finally, FIG. 6 relates to a "transient speed" operating mode of the turbomachine 10, in which hot air penetrates directly into the intermediate cavity 62 and directly into the outlet cavity 63.

As explained above, operation of the vertical piston 71 is dependent on the centrifugal force applied to the turbomachine 10. This vertical piston 71 is advantageously positioned only on a rotating part of the turbomachine 10.

When the rotation speed of the turbomachine 10 is no longer high enough, for example during idling phases, the spring 72 pushes the vertical piston 71 in the radial direction towards the rotation axis T of the turbomachine 10, which allows hot air to supply the outlet cavity 63 directly without being cooled, i.e. without passing through the intermediate cavity 62.

With reference to FIGS. 4A and 4B related to the "low speed" operating mode of the turbomachine 10 (low speed rotation of the propellers 11 and 12), the centrifugal effect is very much reduced by the spring 72, that is selected to be sufficiently stiff to push the vertical piston vertical 71 to stop in contact with the bottom of the inlet cavity 61. Openings formed in the transverse walls of the piston 71 are provided such that in this piston stop position, hot air passes through the piston and penetrates directly into the outlet cavity 63. In other words, in its radially inner position, the vertical piston 71 prevents hot air entering into the annular compartment 60 from being diverted to the intermediate cavity 62 that contains the heat exchanger 64.

As shown on FIG. 4B, the pressure Pci within the intermediate cavity 62 is less than the pressure Pce within the inlet cavity 61 and inside the piston 71.

Furthermore, the end chamber 65 at pressure Pex is defined as corresponding to the part of the inlet cavity 61 located between the vertical piston 71 and the radially inner wall of the inlet cavity 61, opposite the radially outer wall of the inlet cavity 71 to which the spring 72 is connected.

In order to obtain a pressure Pex in the end chamber 65 approximately equal to the pressure Pci in the intermediate cavity 62, the annular compartment 60 comprises a pressure tap channel 75 connecting the intermediate cavity 62 to the end chamber 65. This diameter of this pressure tap channel can be small , for example of the order of 1 to 2 mm. Consequently, almost no pressure difference will be applied to the spring 72. In this way, in practice the only forces applied to the spring 72 are the centrifugal force and the force of the spring 72 itself.

Advantageously, in this so-called "low speed" phase, the pressure Pex in the end chamber remains lower than the pressure Pci in the intermediate cavity 62, while being approximately equal to this pressure Pci.

Preferably, the pressure difference between the pressure Pce in the inlet cavity 61 inside the piston 71 and the pressure Pci in the intermediate cavity 62 is approximately equal to the pressure difference between the pressure Pce in the inlet cavity 61 and the pressure Pex in the end chamber 65.

With reference to FIGS. 5A and 5B dealing with the "high speed" operating mode of the turbomachine 10 (high rotation speeds of propellers 11 and 12), the centrifugal effect on the vertical piston 71 causes compression of the spring 72, which allows the piston to move as far as a radially outer stop position that allows hot air to pass into the intermediate cavity 62 in contact with the heat exchanger 64. In other words, starting from the position of the vertical piston 71 with reference to FIGS. 4A and 4B when the turbomachine is operating at "low speed", displacement of the piston in "high speed" operation will cause hot air entering the annular chamber 60 to be diverted to the heat exchanger 64.

Finally, FIG. 6 illustrates a "transient speed" operating mode, in which hot air penetrates partly into the intermediate 62 cavity and partly into the outlet cavity 63. More precisely, when the air passage between the inlet cavity 61 and the intermediate cavity 62 opens, the pressure Pci in the intermediate cavity 62 does not quickly become balanced with the pressure Pce in the inlet cavity 61, in other words the pressure Pce remains higher than the pressure Pci, while the pressure Pex in the end chamber 65 does very quickly become balanced with the pressure Pce in the inlet cavity 61, in other words the pressure Pce is practically equal to the pressure Pex. Nevertheless, as long as the pressure Pci in the intermediate cavity 62 is less than the pressure Pce in the inlet cavity 61, forces due to pressure differences on each side of the vertical piston 71 will tend to force the piston 71 upwards, into the configuration shown in FIG. 5B.

A second embodiment in which the piston 71 is said to be "horizontal", in other words its largest dimension lies along an axial direction, in other words a direction parallel to the rotation axis T of the turbomachine, will now be described with reference to FIGS. 8A to 9B. FIG. 7 illustrates the application of this second embodiment of the air circulation device for a turbomachine with a pair of puller type contra-rotating open rotor propellers.

Such a bypass system 70 with a horizontal piston is characterised in that its operation depends on the pressure of hot air penetrating into the annular compartment 60.

Figure 8A:
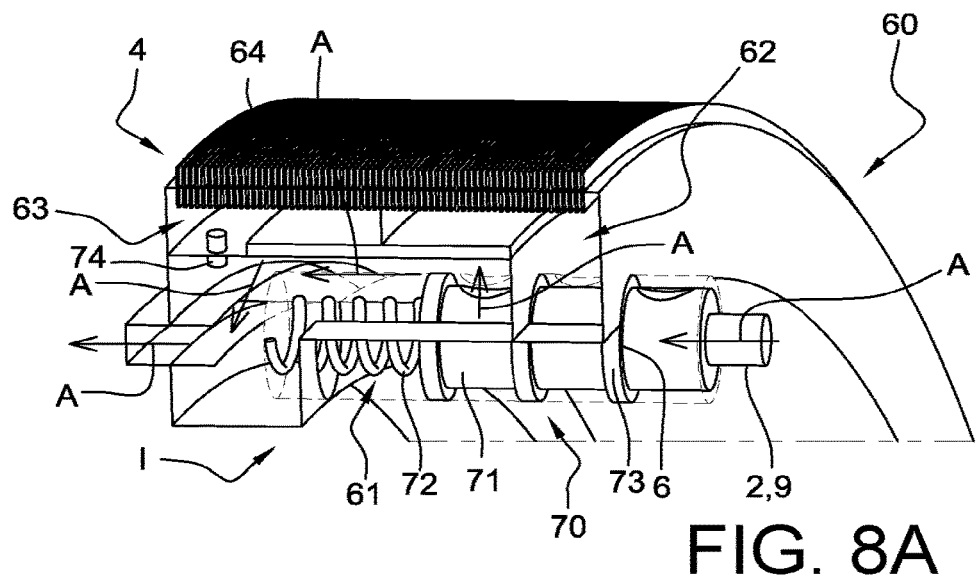
FIG. 8A contains a partial sectional perspective view, and FIG. 8B contains a diagrammatic axial sectional view representing the annular compartment of the turbomachine in FIG. 7 with a bypass system in a "low speed" phase, FIG. 9A contains a partial sectional perspective view, and FIG. 9B contains a diagrammatic axial sectional view representing the annular compartment of the turbomachine in FIG. 7 with a bypass system in a "high speed" phase, and FIGS. 10A and 10B contain diagrammatic axial sectional views representing an annular compartment of an air circulation device of an example of a puller type turbomachine according to the invention, comprising a mobile bypass element in the form of a swing valve, in a "low speed" phase and in a "high speed" phase respectively.
Figure 8B:
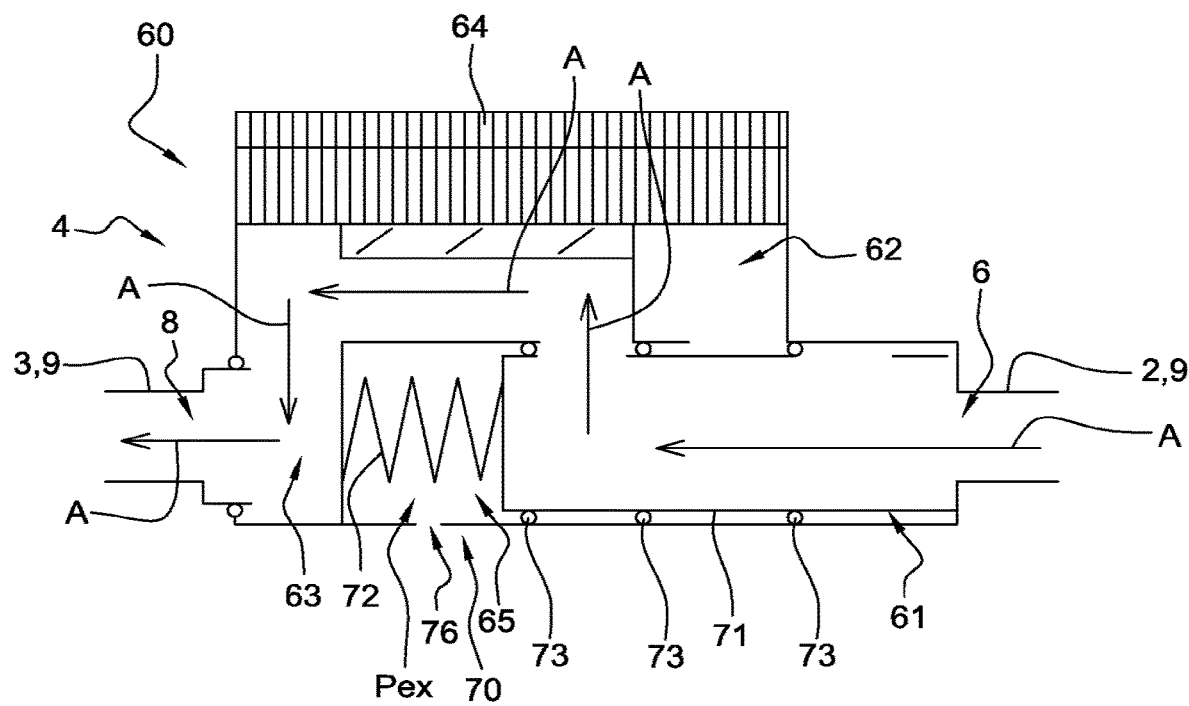
Figure 9A:
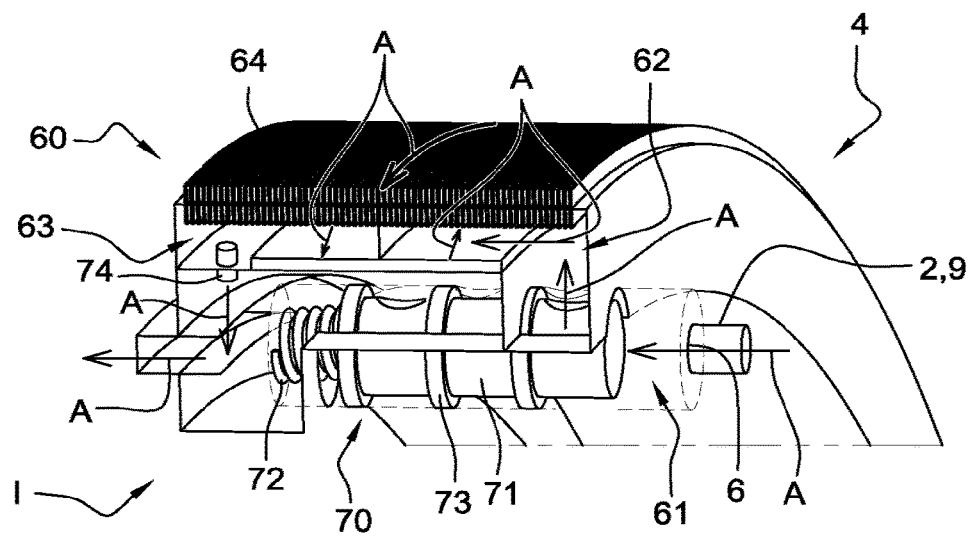
Figure 9B:
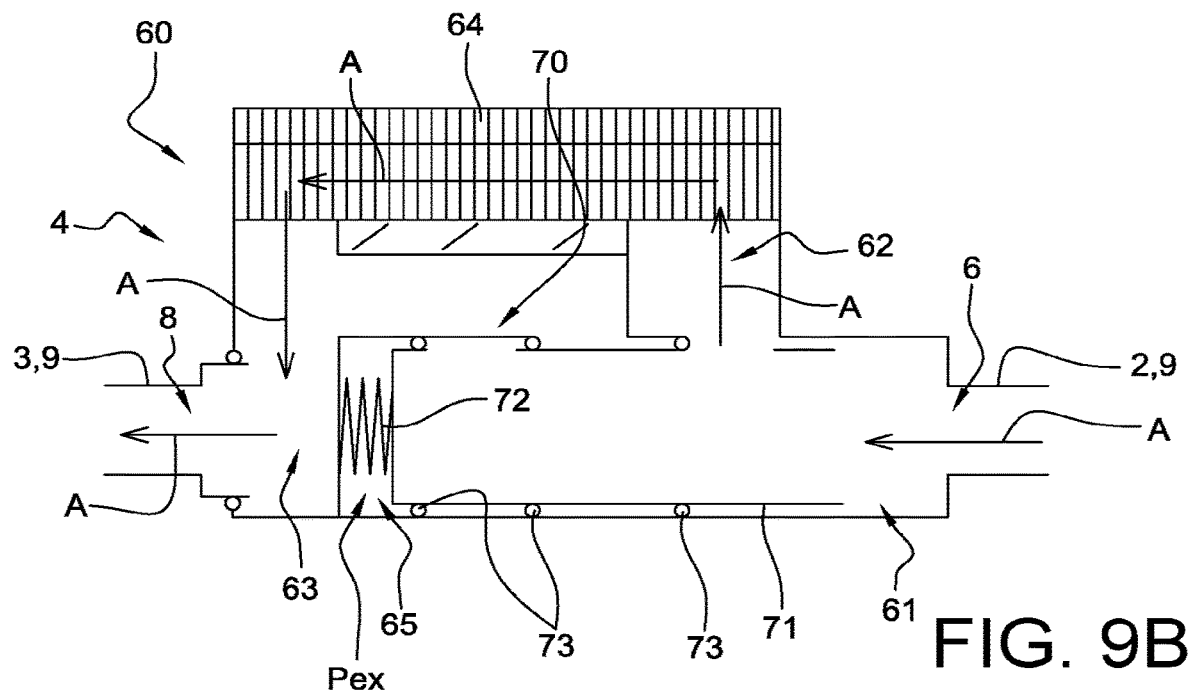

FIGS. 8A and 8B relate to a "low speed" operating mode of the turbomachine 10, in which hot air is transferred directly upstream from the turbomachine 10 without being cooled, in other words without passing through the heat exchanger 64. FIGS. 9A and 9B relate to a "high speed" operating mode of the turbomachine 10, in which hot air passes through the heat exchanger 64 before arriving upstream from the turbomachine 10.

As explained above, operation of the horizontal piston 71 is dependent on pressure forces of the hot bleed air from the annular compartment 60. The hot bleed air pressure is dependent on the speed of the high pressure compressor 14, and thus to a certain extent on the rotation speed of the propellers 11 and 12.

With reference to FIGS. 8A and 8B describing "low speed" operating mode of the turbomachine 10 (low speed rotation of the propellers 11 and 12), hot air is brought into the annular compartment 60 through an inlet orifice 6 located approximately along the axis of the inlet cavity 61, part of which is formed inside the horizontal piston 71. In the same way as for the previous embodiment, the piston 71 is provided with two openings in its side wall, offset along the longitudinal direction. In this case, both of the lateral openings of the piston 71 are outlets though which air can be directed into the intermediate cavity 62 and/or the outlet cavity 63. During operation at "low speed", the hot air pressure brought into the annular compartment 60 is moderate and will not be sufficient for complete displacement of the horizontal piston 71 to its maximum movement distance towards the inlet cavity 61 onto which the spring 72 is connected, and therefore the spring will not be fully compressed. Thus, hot air passing through the horizontal piston 71 is directed directly and entirely into the outlet cavity 63. In other words, at "low speed", in other words in an operating phase of the engine in which the temperature of the air entering the annular compartment remains below a predetermined threshold, the inlet air is not cooled by the bypass system 70 because the horizontal piston 71 does not divert hot air towards the intermediate cavity 62 in which the heat exchanger 64 is located.

For the purposes of this description, the end chamber 65 at pressure Pex is defined as corresponding to the part of the inlet cavity 61 located between the horizontal piston 71 and the upstream wall of the inlet cavity 61, to which the spring 72 is connected. This upstream wall of the inlet cavity 61 is adjacent to the outlet cavity 63 and opposite an inlet opening to the inlet cavity 61 to which a bleed conduit or an intermediate conduit 9 is connected. The horizontal piston 71 comprises an end wall in contact with which the spring 72 bears, and that forms an air tight separation between the end chamber 65 and the interior of the piston that is in communication with the inlet orifice. The seal is made by at least one annular seal 73 mounted on the piston close to said end wall.

Thus, as shown on FIG. 8B, the pressure Pex in the end chamber containing the spring 72 is kept approximately constant by putting the end chamber 65 into communication with the interior of the pod compartment of the rotating part 24, this compartment being approximately at atmospheric pressure. This communication that is not described in detail herein may for example by made by creating an orifice 76, particularly by drilling, made through the internal wall of the inlet cavity 61, as can be seen on FIG. 8B. The approximately constant pressure in the end chamber 65 can assure that axial forces due to the differential pressure applied on the end wall of the piston 71 are approximately proportional to the hot air pressure at the inlet to the inlet cavity 61. Since the hot air pressure varies continuously with the air temperature and therefore with the rotation speed of the turbomachine 10, the axial force applied by the piston 71 on the spring 72 depends on this engine speed.

With reference to FIGS. 9A and 9B dealing with "high speed" operating mode of the turbomachine 10 (high rotation speeds of propellers 11 and 12), displacement of the horizontal piston 71 causes compression of the spring 72, which allows hot air to pass into the intermediate cavity 62 in contact with the heat exchanger 64. In other words, the horizontal piston 71 creates a bypass or deviation of hot air entering the annular compartment to the heat exchanger 64.

The spring 72 can be calibrated to adjust the hot air temperature at the inlet to the inlet cavity 61 at which the changeover to the heat exchanger 64 will take place The design of the mobile bypass element 71 in the form of a piston is not exclusive, and other types of mobile bypass elements can be envisaged. Thus for example, FIGS. 10A and 10B contain diagrammatic axial sectional views representing an annular compartment 60 of an air circulation device 1 of an example of a puller type turbomachine 10 according to the invention, comprising an mobile bypass element 71 in the form of a valve pivoting under the effect of the centrifugal force applied to the centre of gravity of the valve 71, in a "low speed" phase and in a "high speed" phase respectively.

The swing valve 71 rotates about its pivot axis XP, remaining engaged on the inlet cavity 61. A spiral spring 72 located around the pivot axis XP applies an elastic return force on the swing valve 71, this return force being associated with a moment (rotation torque) that tends to return the valve into the position shown on FIG. 10A in which hot inlet air circulates directly to the outlet cavity.

Figure 10A:
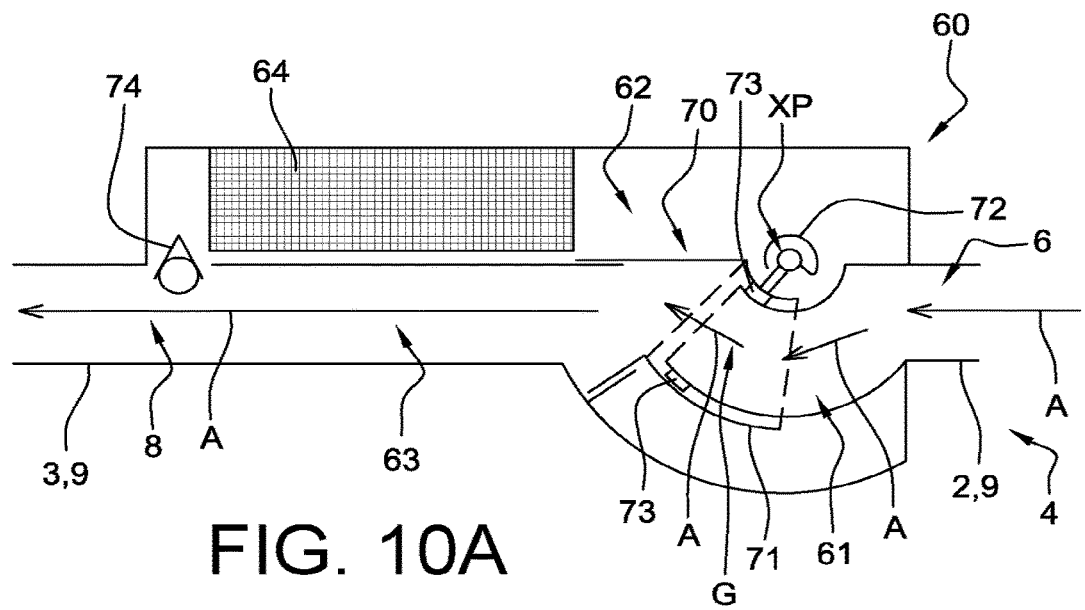
Figure 10B:
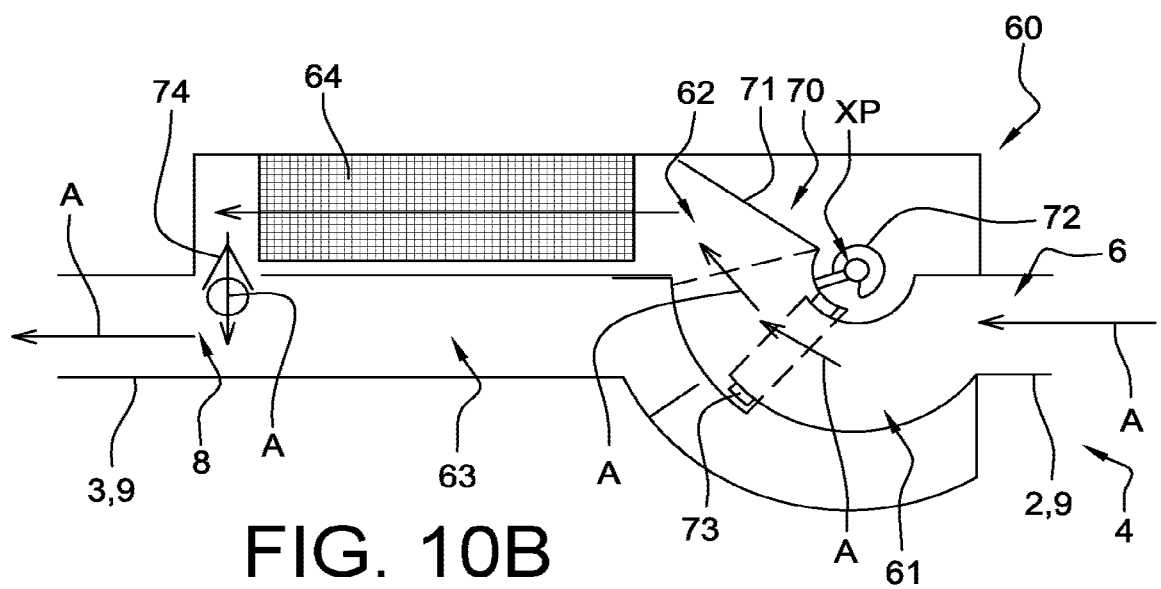

During "high speed" operating mode, as shown in FIG. 10B, the centrifugal force applied to the swing valve 71 is associated with a moment (rotation torque) in the direction opposite to the direction of the moment applied by the elastic return force of the spring, and that exceeds this elastic return force. Since the centrifugal force is higher than the elastic return force, the valve rotates about its pivot axis XP to divert hot air from the inlet cavity 71 to the intermediate cavity 62 so that it can be cooled in contact with the heat exchanger 64.

On the other hand, during the "low speed" operating mode, as shown on FIG. 10A, the centrifugal force applied on the swing valve 71 is no longer higher than the elastic return force of the spring 72, such that the swing valve 71 closes off access to the intermediate cavity 62 and allows hot air to pass directly from the inlet cavity 61 to the outlet cavity 63.

The rotation moment of the centrifugal force on the centre of gravity G of the swing valve 71 increases as the swing valve 71 moves from its "low speed" position to its "high speed" position, making the transition faster.

Obviously, the invention is not limited to the example embodiments that have just been described. An expert in the subject can make various modifications to it.

In particular, a plurality of bleed conduits 2 and conveyance conduits 3, and possibly circulation or intermediate conduits 9 between these bleed and conveyance conduits, arranged around the rotation axis T of the turbomachine 10. For example, the device 1 according to the invention may comprise at least three bleed conduits 2 and at least three conveyance conduits 3, and possibly at least three circulation conduits 9, arranged around the rotation axis T of the turbomachine 10, particularly at regular intervals. This can result in a better distribution of the air flow on the upstream part of the turbomachine 10. It also helps maintain the equilibrium of the turbomachine 10.

Furthermore, although deicing and/or anti-icing is/are preferably done at the air intake into the turbomachine 10, and particularly at the annular lip 38 of the air inlet 42, it can be done at any part upstream from the turbomachine fan at which icing could occur, the fan in this case being composed of the propellers 11 and 12, and particularly for an intake cone forward from the turbomachine 10 when the air inlet for the gas generator is located downstream from the fan of the turbomachine 10.

Furthermore, although the described embodiments preferably relate to an open rotor puller type of turbomachine 10 comprising a gas generator 13 and a pair of open rotor contra-rotating propellers mounted upstream from the gas generator 13, the invention can be applied to any type of turbomachine comprising a gas generator and a fan comprising an open rotor propeller or a pair of co-rotating open rotor propellers, installed upstream from the gas generator and possibly associated with one or several fixed guide vanes. For example, the invention can be applied to an "Unducted Single Fan" (USF) type turbomachine that by definition comprises an open rotor propeller followed by a guide vane.

Thus, the air circulation device according to the invention may comprise a first hot air passage device formed at the interface between the first and second co-rotating or contra-rotating parts of a turbomachine, and a second hot air passage device formed at the interface between the second rotating part and a fixed part of the turbomachine. As a variant, the air circulation device can include a hot air passage device formed at the interface between a single rotating part of the turbomachine and a fixed part of the turbomachine. The second segment is then fixed in the turbomachine, and hot air circulates from the second segment to the first segment.

The invention claimed is:

1. Air circulation device for a turbomachine, comprising an air conveyance circuit adapted to bring hot bleed air from the turbomachine to a part of the turbomachine to be heated, said conveyance circuit comprising:
    a first segment fixed in rotation to a rotating part of the turbomachine and comprising at least one hot air conveyance conduit, and
    a hot air passage device, comprising an annular compartment fixed in rotation to the first segment,
in which the annular compartment comprises at least one heat exchanger in contact with air external to the turbomachine, and in which the hot air passage device comprises at least one hot air bypass system adapted to deviate air entering into the hot air passage device and to make it circulate along the heat exchanger when a temperature of intake air is above a predetermined threshold.

2. Device according to claim 1, in which the air conveyance circuit includes a second segment rotating relative to the first segment, and in which the hot air passage device forms a fluid connection between the first and the second segments.

3. Device according to claim 1, in which the hot air passage device comprises:
    an air intake cavity,
    an intermediate cavity located in the annular compartment, adjacent to the heat exchanger and that can be brought into fluid communication with the intake cavity by the bypass system such that hot air circulates in contact with the heat exchanger to be cooled, and
    an air outlet cavity that can be brought selectively into fluid communication with the air intake cavity or with the intermediate cavity by a device that actuates the bypass system capable or reacting to a physical parameter related to a temperature of the hot bleed air from the turbomachine.

4. Device according to claim 3, in which the actuation device is self-contained and is energised by the physical parameter to which it reacts.

5. Device according to claim 3, in which hot air is bled from a compressor of the turbomachine and in which the physical parameter related to the temperature of the hot bleed air is pressure of this air.

6. Device according to claim 3, in which hot air is bled from a compressor of the turbomachine and in which the physical parameter related to the temperature of the hot bleed air is centrifugal force applied on the actuation device due to rotation of a part of the turbomachine with which the actuation device is fixed in rotation.

7. Device according to claim 3, in which the actuation device includes a mobile bypass element and a return element applying a predetermined return force on the mobile bypass element.

8. Device according to claim 7, in which the mobile bypass element is in the form of a piston located in the air intake cavity.

9. Device according to claim 7, in which the mobile bypass element is in the form of a swing valve that pivots about a pivot axis force fitted onto the air intake cavity.

10. Device according to claim 3, in which the annular compartment comprises a non-return valve positioned in a fluid path between the intermediate cavity and the outlet cavity, preventing any air passage from the outlet cavity to the intermediate cavity.

11. Device according to claim 1, in which the heat exchanger includes a radially outer annular compartment sealing wall and fins formed on an outer face and on an inner face of this wall.

12. Device according to claim 1, in which the hot air passage device comprises several bypass systems at a circumferential spacing from each other, each bypass system being associated with a heat exchanger extending over almost all or part of a circumferential space between the bypass system and an adjacent bypass system.

13. Device according to claim 2, in which the second segment is fixed in the turbomachine, and in which hot air circulates from the second segment to the first segment.

14. Device according to claim 2, in which the hot air passage device includes an annular connection conduit communicating with the annular compartment, and a sealing system connecting the annular connection conduit to an annular conduit fixed to the second segment.

15. Turbomachine comprising an air circulation device according to claim 1, and a gas generator, at least one rotating part of the turbomachine comprising an open rotor propeller or a pair of co-rotating or contra-rotating propellers, installed upstream from the gas generator.

* * * * *